United States Patent
Schafer et al.

(10) Patent No.: US 10,303,965 B2
(45) Date of Patent: May 28, 2019

(54) DEFECTIVE PIXEL IDENTIFICATION USING MACHINE LEARNING

(71) Applicant: Siemens Medical Solutions USA, Inc., Malvern, PA (US)

(72) Inventors: Sebastian Schafer, Madison, WI (US); Kevin Royalty, Fitchburg, WI (US)

(73) Assignee: Siemens Healthcare GmbH, Erlangen (DE)

( * ) Notice: Subject to any disclaimer, the term of this patent is extended or adjusted under 35 U.S.C. 154(b) by 88 days.

(21) Appl. No.: 15/451,249

(22) Filed: Mar. 6, 2017

(65) Prior Publication Data
US 2018/0253624 A1 Sep. 6, 2018

(51) Int. Cl.
*G06K 9/03* (2006.01)
*G06K 9/46* (2006.01)
*G06K 9/62* (2006.01)

(52) U.S. Cl.
CPC ............. *G06K 9/03* (2013.01); *G06K 9/4628* (2013.01); *G06K 9/6271* (2013.01)

(58) Field of Classification Search
CPC .... G06K 9/626; G06K 9/4604; G06K 9/6232; G06K 9/3233; G06K 9/4628; G06K 9/66; G06K 9/00288; G06N 3/0454
See application file for complete search history.

(56) References Cited

U.S. PATENT DOCUMENTS

| | | | |
|---|---|---|---|
| 2003/0007601 A1* | 1/2003 | Jaffray | A61B 6/032 378/65 |
| 2009/0252397 A1* | 10/2009 | Kuwabara | G06T 5/005 382/132 |
| 2011/0057802 A1* | 3/2011 | Topfer | A61B 6/585 340/584 |
| 2013/0051516 A1 | 2/2013 | Yang et al. | |
| 2015/0238148 A1 | 8/2015 | Georgescu et al. | |
| 2016/0048741 A1 | 2/2016 | Nguyen et al. | |
| 2016/0093048 A1 | 3/2016 | Cheng et al. | |
| 2017/0020475 A1* | 1/2017 | Spahn | A61B 6/5205 |
| 2017/0109881 A1* | 4/2017 | Avendi | G06T 7/0012 |
| 2018/0075581 A1* | 3/2018 | Shi | G06T 3/4053 |

* cited by examiner

*Primary Examiner* — Ali Bayat

(57) ABSTRACT

A framework for defective pixel identification is described herein. In accordance with one aspect, the framework performs a machine learning technique to train a classifier using a training image dataset. The trained classifier is applied to a current image to identify one or more defective pixels, which may then be corrected.

23 Claims, 3 Drawing Sheets

DEFECTIVE PIXEL IDENTIFICATION USING MACHINE LEARNING

TECHNICAL FIELD

The present disclosure generally relates to digital medical data processing, and more particularly to pixel identification using machine learning.

BACKGROUND

Digital medical images are reconstructed using raw image data obtained from a scanner. One type of scanner is a flat panel detector, which is a solid-state X-ray digital radiography device. To obtain the image data, X-rays are passed through the subject being imaged and sensed by the flat panel detector. Flat-panel detectors are more sensitive and faster than other types of imaging, such as film. However, bad, failing or broken (i.e., "defective") pixels in the flat panel detector may result in ring artifacts in reconstructed volumetric images, thereby compromising image quality.

Such "bad pixel" problem may be solved by two different approaches. In a first approach, when a detector is delivered or during required maintenance, a service engineer performs a number of test image acquisitions with varying detector exposures to determine and calibrate the detector for offset, gain and defective (or bad) pixels. While detector offset and gain vary only minimally with time, the failure of detector elements resulting in defective image pixels is a frequently occurring event. A defective pixel map may be created for each detector to identify defective pixels. However, it is too time-consuming to calibrate each detector for every failing element.

Another approach is to correct pixels (or voxels) in the volumetric image reconstructed from the raw image data. The bad pixels are represented as dark or bright circles or artifacts in the reconstructed image. Different methods may be used to identify these ring-like structures and interpolate the corrupt image data. However, this 'after the fact' processing approach presents the challenges of misidentifying these artifacts and interpolating larger areas of the reconstructed image.

SUMMARY

Described herein is a framework for pixel identification using machine learning. In accordance with one aspect, the framework performs a machine learning technique to train a classifier using a training image dataset. The trained classifier is applied to a current image to identify one or more defective pixels, which may then be corrected.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
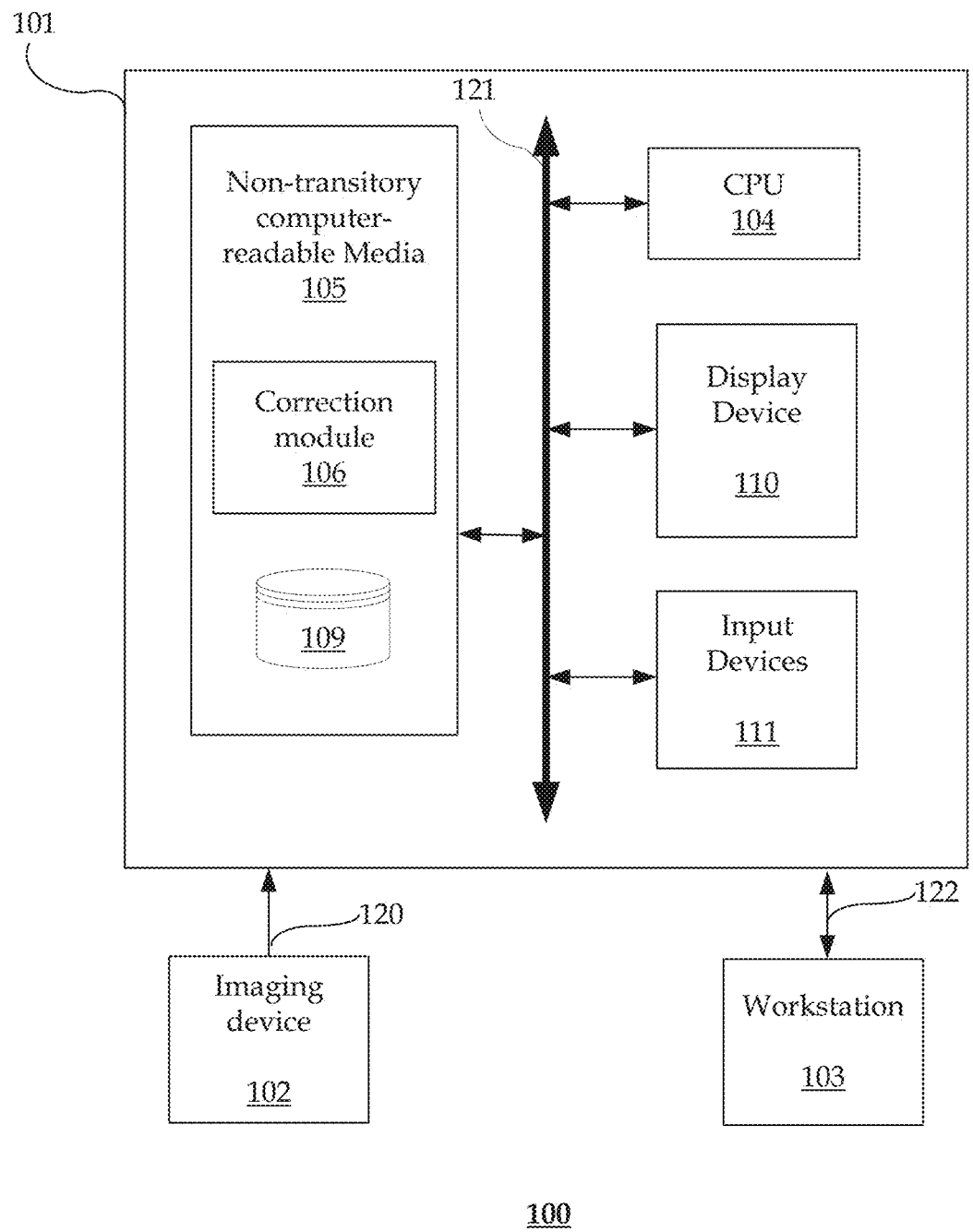
FIG. 1 is a block diagram illustrating an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed; on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MM, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displayed as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

A framework for automatically identifying defective pixels is described herein. In some implementations, the framework uses a machine learning technique to train a classifier to identify defective (or bad) pixels in an image. The image may be acquired by, for example, a flat panel detector. Advantageously, the framework is able to identify defective pixels from an image containing anatomical patient information, not from a specific calibration image. Additionally, the framework enables online defective pixel correction, resulting in superior 3D image reconstruction quality, reduced service engineer onsite time and improved customer satisfaction compared to standard techniques. These and other features and advantages will be described in more details herein.

FIG. 1 is a block diagram illustrating an exemplary system 100. The system 100 includes a computer system 101 for implementing the framework as described herein. In some implementations, computer system 101 operates as a standalone device. In other implementations, computer system 101 may be connected (e.g., using a network) to other machines, such as imaging device 102 and workstation 103. In a networked deployment, computer system 101 may operate in the capacity of a server (e.g., thin-client server), a cloud computing platform, a client user machine in server-client user network environment, or as a peer machine in a peer-to-peer (or distributed) network environment.

In some implementations, computer system 101 comprises a processor or central processing unit (CPU) 104 coupled to one or more non-transitory computer-readable media 105 (e.g., computer storage or memory), display device 110 (e.g., monitor) and various input devices 111 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in non-transitory computer-readable media 105. In particular, the present techniques may be implemented by a correction module 106 and a database 109.

Non-transitory computer-readable media 105 may include random access memory (RAM), read-only memory (ROM), magnetic floppy disk, flash memory, and other types of memories, or a combination thereof. The computer-readable program code is executed by CPU 104 to process medical data retrieved from, for example, imaging device 102. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing a database (or dataset) 109. Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a cloud platform or system, a picture archiving and communication system (PACS), or any other hospital, medical institution, medical office, testing facility, pharmacy or other medical patient record storage system.

Imaging device 102 acquires medical image data 120 associated with at least one patient. Such medical image data 120 may be processed and stored in database 109. Imaging device 102 may be a radiology scanner (e.g., X-ray, MR or a CT scanner) and/or appropriate peripherals (e.g., keyboard and display device) for acquiring, collecting and/or storing such medical image data 120.

The workstation 103 may include a computer and appropriate peripherals, such as a keyboard and display device, and can be operated in conjunction with the entire system 100. For example, the workstation 103 may communicate directly or indirectly with the imaging device 102 so that the medical image data acquired by the imaging device 102 can be rendered at the workstation 103 and viewed on a display device. The workstation 103 may also provide other types of medical data 122 of a given patient. The workstation 103 may include a graphical user interface to receive user input via an input device (e.g., keyboard, mouse, touch screen voice or video recognition interface, etc.) to input medical data 122.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
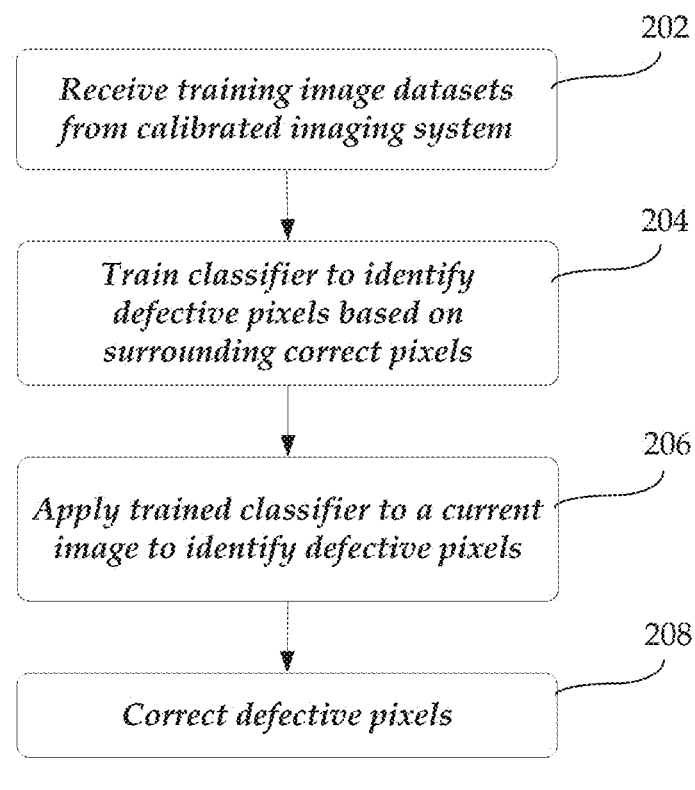
FIG. 2 shows an exemplary method of defective pixel identification.

FIG. 2 shows an exemplary method 200 of defective pixel identification by a computer system. It should be understood that the steps of the method 200 may be performed in the order shown or a different order. Additional, different, or fewer steps may also be provided. Further, the method 200 may be implemented with the system 101 of FIG. 1, a different system, or a combination thereof.

At 202, correction module 106 receives one or more training image datasets from a calibrated imaging system. The training image datasets may contain images (e.g., 2D flat panel radiographic images or 3D reconstructed images) containing anatomical information of a patient. The training image datasets may be acquired by an imaging device 102 (e.g., flat panel detector) that has been recently calibrated. The imaging device 102 may have been calibrated by a service engineer performing a number of test image acquisitions with varying exposures to determine and calibrate the device for offset, gain and defective pixels.

The training image datasets include raw data images and ground truth images. More particularly, the raw data may be images corrected for offset and gain only (but not defective pixels), while the ground truth images are the same images corrected for offset, gain and defective pixels. Correction module 106 may identify 'n' datasets from the training image datasets for training the classifier, wherein 'n' is an integer greater than zero and less than the total number 'T' of training datasets available. In some implementations, correction module 106 may randomly divide the training datasets into a larger subset of 'n' datasets for training, and a smaller subset of 'T-n' datasets for testing. Correction module 106 may re-divide the training datasets into different subsets (with different "n" values) in subsequent training sessions. Optimally, the variety of images identified for training may cover all or most varieties of applications in interventional radiology and surgery.

At 204, correction module 106 performs a machine learning technique based on the training image datasets to train a classifier to identify defective pixels. The classifier may be trained to identify defective pixels based on surrounding correct pixels. The classifier may be trained by using a suitable machine learning technique, such as random forests, convolutional neural networks, convolutional networks, or any other technique. It should be appreciated that other types of machine learning algorithms may also be used.

In accordance with some implementations, the classifier is trained using random forests (or random decision forests). Random forests operate by constructing a multitude of decision trees at training time and outputting the class that is the mode of the classes. Correction module 106 may first determine spatial features that can be used to identify defective pixels. Exemplary spatial features include, but are not limited to, pixel values, derivatives in x-direction and/or y-direction, and/or median positions in a square (i.e., N-by-N) neighborhood, wherein 'N' is an integer greater than zero and less than a width and/or height of a training image. An array of decision trees may be grown from the training dataset and pruned for fitness. For example, at each decision junction (or branch) of a decision tree, a spatial feature is randomly selected and an optimal threshold value of the spatial feature is determined to satisfy the ground truth images in the training dataset. A predetermined number of decision trees with a predetermined number of randomly selected spatial features may be grown and trained. After training, a pixel input into the trained random forest may be assigned a likelihood or probability (e.g., a value between 0 and 1) that it is a defective pixel.

In accordance with other implementations, convolutional neural networks are trained to identify defective pixels. Convolutional neural networks are a type of feed-forward artificial neural network in which the connectivity pattern between its neurons is inspired by the organization of the animal visual cortex. The architecture of convolutional neural networks includes a stack of distinct layers (i.e., input layers, hidden layers and output layers) that transform the input image into one or more output values.

Figure 3:
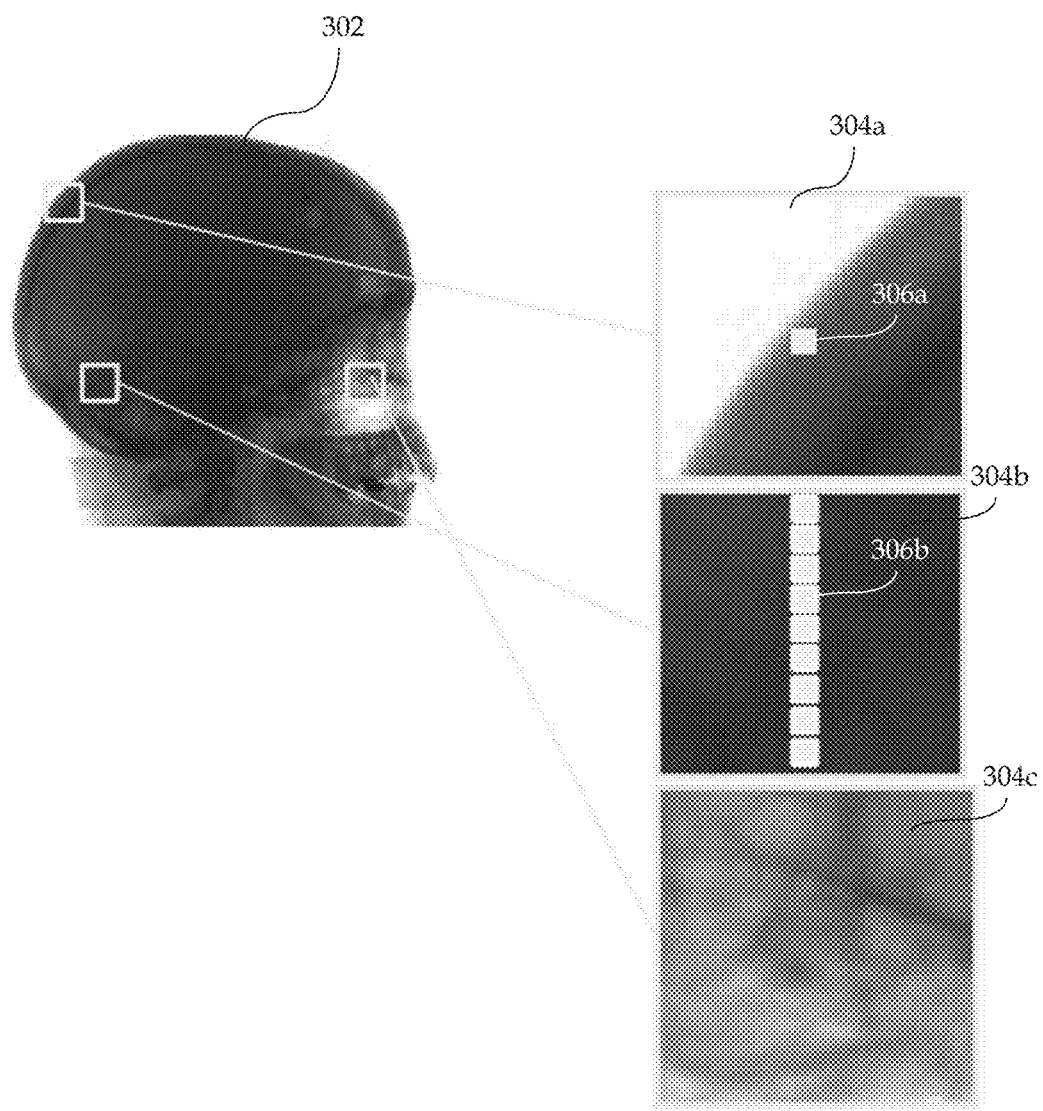
FIG. 3 shows an exemplary input training image and exemplary N-by-N patches extracted from the image.

The input layer may include N-by-N input neurons that represent a square patch (i.e., N-by-N patch) of input image pixels centered at a specific location. FIG. 3 shows an exemplary input training image 302 and exemplary N-by-N patches 304a-c extracted from different locations on the image 302 represented by the input layer. In image patch 304a, the defective pixel appears as an isolated bright spot 306a with maximum signal. In image patch 304b, the defective pixel appears as an isolated bright in-line pattern 306b (e.g., due to read-out line failure of the flat panel detector). It should be appreciated that the defective pixels may also appear as dark spots or line patterns with zero signal. The ground truth images corresponding to images 304a-b have been corrected for these defects 306a-b. Image patch 304c does not contain any defective pixels.

The hidden layers may be setup as N-by-N convolutional objects with a one-by-one output. Learning is performed by auto-tuning the weights of these hidden layers. The number of hidden layers may be adjusted to achieve the desired accuracy. The output layer may include only one node that provides results of all hidden layers in response to a defective pixel element being detected. The results represent the likelihood (e.g., value between 0 and 1) of a center pixel of an N-by-N input image patch being defective.

The trained classifier may be tested with 'k' test cases. Each test case includes a pair of ground truth image and raw data image. The trained classifier may return a value that indicates the likelihood that an image pixel is defective. A set of values indicating defective pixels for a raw data image may be obtained. The efficacy of the classifier may be evaluated by comparing the number of defective pixels found by the classifier to the number of defective pixels identified in the corresponding ground truth image.

At 206, correction module 106 applies the trained classifier to a current image to identify defective pixels. The current image is a radiographic image of a patient currently under study. The current image may be acquired using the same modality (e.g., flat panel detector) but different imaging device or system as the training image dataset. The trained classifier may be applied to each pixel of the current image to determine a likelihood value that represents the probability of it being defective. Alternatively, the current image may be divided into a set of N-by-N patches. The trained classifier may then be applied to each of the N-by-N patches to determine a likelihood value that represents the probability that a center pixel of the patch is defective. A set of likelihood values may be generated for all the pixels in the current image. A pixel may then be identified as "defective" in response to its likelihood value exceeding a predetermined threshold value.

At 208, correction module 106 corrects defective pixels identified by the trained classifier. In some implementations, correction module 106 performs the correction online. Pixel correction may be performed by replacing a defective pixel with an interpolated value based on neighboring non-defective pixels in the current image. The interpolated value may be obtained by performing, for example, linear interpolation of the image intensity values from the non-defective pixels surrounding the defective pixel. Advantageously, the present framework results in superior image quality, reduced service engineer on-site time and improved customer satisfaction compared to the current standard.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. One or more non-transitory computer readable media embodying a program of instructions executable by machine to perform operations for defective pixel identification, the operations comprising:
   receiving a training image dataset;
   training, using the training image dataset, convolutional neural networks to identify defective pixels;
   identifying one or more defective pixels in a current image by applying the trained convolutional neural networks to the current image and generating likelihood values; and
   correcting the one or more identified defective pixels, and
   wherein the training image dataset comprises raw data images and ground truth images, wherein the raw data images include images corrected for offset and gain only, and the ground truth images include images corrected for offset, gain and defective pixels.

2. The one or more non-transitory computer readable media of claim 1 wherein the one or more defective pixels appear in the current image as one or more isolated spots.

3. The one or more non-transitory computer readable media of claim 1 wherein the one or more defective pixels appear in the current image as one or more in-line patterns.

4. The one or more non-transitory computer readable media of claim 1 wherein the training image dataset comprises two-dimensional flat panel radiographic images.

5. A system comprising:
   a non-transitory memory device for storing computer readable program code; and
   a processor in communication with the memory device, the processor being operative with the computer readable program code to perform operations including
   receiving a training image dataset,
   performing a machine learning technique to train a classifier using the training image dataset,
   identifying one or more defective pixels in a current image by applying the trained classifier to the current image, and
   correcting the one or more identified defective pixels, and
   wherein the training image dataset comprises raw data images and ground truth images, wherein the raw data images include images corrected for offset and gain only, and the ground truth images include images corrected for offset, gain and defective pixels.

6. The system of claim 5 wherein the training image dataset comprises two-dimensional flat panel radiographic images.

7. The system of claim 5 wherein the processor is operative with the computer readable program code to perform the machine learning technique based on random forests.

8. The system of claim 7 wherein the processor is operative with the computer readable program code to perform the machine learning technique by
   determining spatial features to identify defective pixels,
   growing decision trees from the training dataset, and
   pruning the decision trees for fitness.

9. The system of claim 8 wherein the spatial features comprise pixel values, derivatives in x-direction or y-direction, median positions in a square neighborhood, or a combination thereof.

10. The system of claim 8 wherein the processor is operative with the computer readable program code to prune the decision trees for fitness by
    randomly selecting at least one of the spatial features at a decision junction of at least one of the decision trees, and
    determining an optimal threshold value of the spatial feature to satisfy ground truth.

11. The system of claim 5 wherein the processor is operative with the computer readable program code to perform the machine learning technique based on convolutional neural networks.

12. The system of claim 11 wherein the convolutional neural networks comprise one or more input layers, hidden layers and output layers.

13. The system of claim 12 wherein the one or more input layers comprise neurons that represent a patch of image pixels centered at a specific location.

14. The system of claim 12 wherein the one or more output layers comprise a node that provides results of the one or more hidden layers.

15. The system of claim 14 wherein the results represent a likelihood that a center pixel of a square patch of the current image is defective.

16. The system of claim 5 wherein the processor is operative with the computer readable program code to identify the one or more defective pixels by determining that a likelihood value generated by the trained classifier exceeds a predetermined threshold value.

17. The system of claim 5 wherein the processor is operative with the computer readable program code to correct the one or more identified defective pixels by replacing the one or more identified defective pixels with one or more interpolated values based on neighboring non-defective pixels.

18. The system of claim 17 wherein the processor is operative with the computer readable program code to generate the one or more interpolated values by performing linear interpolation of image intensity values from the neighboring non-defective pixels.

19. A method, comprising:
    receiving a training image dataset;
    performing a machine learning technique to train a classifier using the training image dataset;
    identifying one or more defective pixels in a current image by applying the trained classifier; and
    correcting the one or more identified defective pixels, and
    wherein the training image dataset comprises raw data images and ground truth images, wherein the raw data images include images corrected for offset and gain only, and the ground truth images include images corrected for offset, gain and defective pixels.

20. A system comprising:
a non-transitory memory device for storing computer readable program code; and
a processor in communication with the memory device, the processor being operative with the computer readable program code to perform operations including
receiving a training image dataset;
performing a machine learning technique to train a classifier using the training image dataset, wherein the processor is operative with the computer readable program code to perform the machine learning technique based on random forests by
determining spatial features to identify defective pixels,
growing decision trees from the training dataset, and
pruning the decision trees for fitness;
identifying one or more defective pixels in a current image by applying the trained classifier to the current image; and
correcting the one or more identified defective pixels.

21. The system of claim 20 wherein the spatial features comprise pixel values, derivatives in x-direction or y-direction, median positions in a square neighborhood, or a combination thereof.

22. The system of claim 20 wherein the processor is operative with the computer readable program code to prune the decision trees for fitness by randomly selecting at least one of the spatial features at a decision junction of at least one of the decision trees, and
determining an optimal threshold value of the spatial feature to satisfy ground truth.

23. A system comprising:
a non-transitory memory device for storing computer readable program code; and
a processor in communication with the memory device, the processor being operative with the computer readable program code to perform operations including
receiving a training image dataset,
performing a machine learning technique to train a classifier using the training image dataset, wherein the processor is operative with the computer readable program code to perform the machine learning technique based on convolutional neural networks comprising one or more input layers, hidden layers and output layers, wherein the one or more output layers comprise a node that provides results of the one or more hidden layers and the results represent a likelihood that a center pixel of a square patch of the current image is defective,
identifying one or more defective pixels in a current image by applying the trained classifier to the current image, and
correcting the one or more identified defective pixels.

* * * * *